United States Patent [19]
Ban et al.

[11] 3,931,556
[45] Jan. 6, 1976

[54] SYSTEM FOR DRIVING A DIRECT-CURRENT MOTOR IN SYNCHRONISM WITH AN EXTERNAL SIGNAL

[76] Inventors: Itsuki Ban, 829, Higa-Oizumi, Nerima; Manabu Shiraki, Koizumiso, 44-1, 2-chome, Cyuou, Nakano, both of Tokyo, Japan

[22] Filed: Oct. 15, 1973

[21] Appl. No.: 406,374

[30] Foreign Application Priority Data
Oct. 16, 1972 Japan.............. 47-102702

[52] U.S. Cl.............. 318/330; 318/138; 318/318
[51] Int. Cl.² .................................... H02K 29/00
[58] Field of Search ........... 318/138, 329, 330, 318, 318/254

[56] References Cited
UNITED STATES PATENTS

| | | | |
|---|---|---|---|
| 3,585,474 | 6/1971 | Kobayashi................. | 318/138 X |
| 3,611,081 | 10/1971 | Watson..................... | 318/138 |
| 3,679,953 | 7/1972 | Bedford.................... | 318/138 |
| 3,743,902 | 7/1973 | Perkins..................... | 318/138 |
| 3,746,941 | 7/1973 | Ageev....................... | 318/138 |
| 3,783,357 | 1/1974 | Ichiyanage................. | 318/138 |

*Primary Examiner*—B. Dobeck
*Attorney, Agent, or Firm*—Waters, Schwartz & Nissen

[57] ABSTRACT

For driving a direct-current motor in tune with the frequency of an external synchronizing signal regardless of any abrupt change in the load or in the synchronizing signal frequency, a rotor position signal is produced in the form of a succession of pulses in phased relationship to the rotation of the motor. A first control circuit is provided to initiate the supply of electrical energy from a DC power supply to the motor in response to each pulse of the synchronizing signal and to suspend the supply of electrical energy in response to each pulse of the rotor position signal. This first control circuit is combined with second and third control circuits adapted to modify the operation of the first control circuit in event the motor has fallen out of synchronism. Thus, when the actual speed of the motor becomes higher than the required synchronous speed, the second control circuit operates to permit the motor to be fed continuously from the DC power supply, and when the actual motor speed becomes lower than the synchronous speed, the third control circuit operates to prevent the motor from being fed from the DC power supply, until the motor is pulled back into synchronous operation. Several other embodiments are disclosed.

8 Claims, 18 Drawing Figures

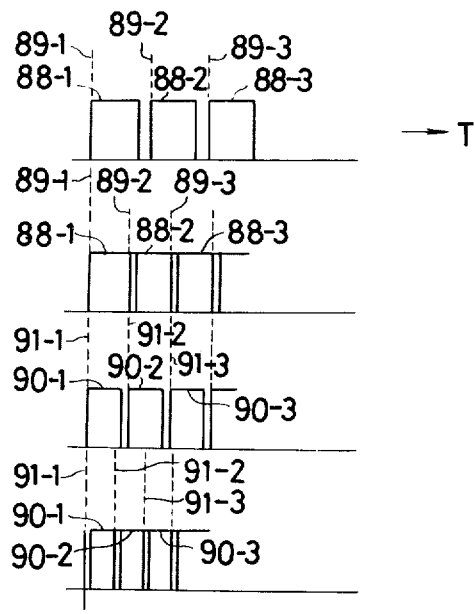
Fig. 8A
Fig. 8B
Fig. 8C
Fig. 8D
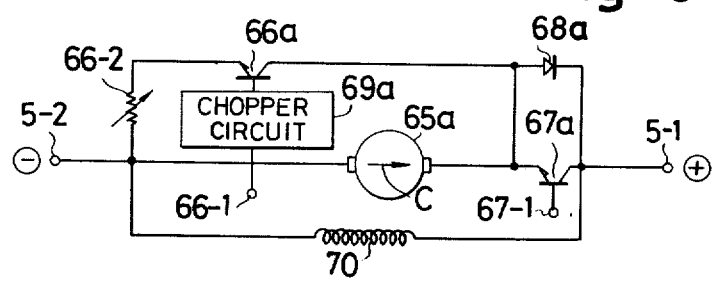
Fig. 9
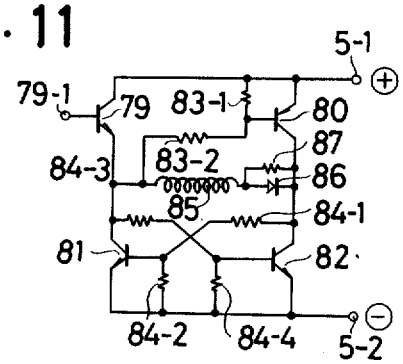
Fig. 11

SYSTEM FOR DRIVING A DIRECT-CURRENT MOTOR IN SYNCHRONISM WITH AN EXTERNAL SIGNAL

BACKGROUND OF THE INVENTION

This invention relates generally to electric motors, and more specifically to a system for controlling the speed of a direct-current motor by an external synchronizing signal so as to maintain the same at synchronous speed in spite of possible rapid changes in the load or in the frequency of the synchronizing signal.

As is well known, synchronous motors have a distinct advantage over other types of motors, in that their speed of rotation is easily controllable in step with the frequency of an AC supply system to which they are connected. However, the synchronous motors are difficult of self-starting and, moreover, are forced to stop when they fall out of synchronism due to a rapid change in the load or in the AC supply frequency.

These disadvantages of the synchronous motors are totally non-existent in direct-current motors, which have no substantial starting problems and which do not stop in spite of rapid changes in the load or in the supply voltage. However, the direct-current motors have their own drawback in connection with the difficulties involved in their speed control.

SUMMARY OF THE INVENTION

In view of the listed advantages and disadvantages of the synchronous motors and direct-current motors of known construction, it is an object of this invention to provide a novel and advanced system for speed control of a direct-current motor in step with an external synchronizing signal, such that the motor operates asynchronously during a starting period and runs on load substantially as a synchronous machine, thereby combining the advantages of both types of motors.

Another object of the invention is to provide a DC motor speed control system whereby the motor when loaded is caused to run in synchronism with an external synchronizing signal by being fed from a DC power supply as regulated by the pulses of the synchronizing signal and of a rotor position signal which is produced in phased relationship to the rotation of its rotor.

A further object of the invention is to provide a DC motor speed control system including means for preventing the motor from making quasi-stable rotation at speed corresponding to an integral multiple or integral measure of the required synchronous speed due to a rapid change in load, in supply voltage, or in synchronizing signal frequency, such that the supply of electrical energy from the DC power supply to the motor is suspended in event the actual speed of the motor has become higher than the required synchronous speed, and is maintained in event the actual motor speed has become lower than the synchronous speed, until the motor is pulled back into synchronism.

A further object of the invention is to provide a DC motor speed control system whereby the fact that the motor has fallen out of synchronism is immediately sensed by either of a pair of monostable circuits to correspondingly regulate the supply of electrical energy from the DC power supply to the motor without any substantial delay, so that the motor speed can almost always be maintained in tune with the synchronizing signal frequency.

A further object of the invention is to provide a DC motor speed control system such that the entire control system can easily be provided in the form of integrated circuitry.

A still further object of the invention is to provide a DC motor speed control system including means for causing the motor to produce both driving torque and retarding torque as dictated by the synchronizing signal and the rotor position signal, whereby the motor can be faithfully maintained at synchronous speed under varying load conditions.

These and other objects, features and advantages of the invention will be apparent from the following description of some preferred embodiments taken in conjunction with the accompanying drawings.

BRIEF DESCRIPTION OF THE DRAWINGS

FIGS. 8A, 8B, 8C and 8D are graphic representations of outputs from a pair of monostable circuits provided in the system of FIG. 7;

FIG. 9 is a schematic electrical diagram of another preferred embodiment of the invention;

FIG. 11 is a schematic electrical diagram of still another preferred embodiment of the invention.

DESCRIPTION OF THE PREFERRED EMBODIMENTS

Figure 1:
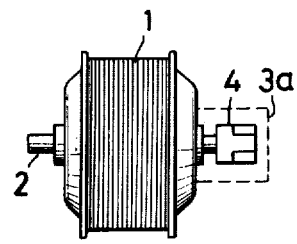
FIG. 1 is a side elevational view of an explanatory nature showing the construction of an example of direct-current motor to which is directed this invention.

Direct-current motors to which is directed this invention may be either of the usual type comprising a commutator and brushes or of brushless type. An exemplified direct-current motor indicated by the numeral 1 in FIG. 1 includes a shaft 2 carrying a commutator 4. A housing 3a is adapted to accommodate the commutator 4 together with the usual brushes, not shown in FIG. 1, riding thereon.

Figure 2:
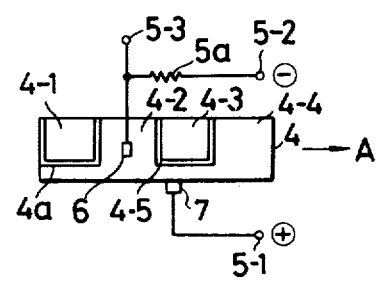
FIG. 2 is a schematic developed view of the commutator and associated means in the exemplified direct-current motor of FIG. 1 which are adapted for the production of a rotor position signal.

As illustrated in more detail in FIG. 2, the commutator 4 is divided into segments 4-1 to 4-4 by slits 4a and 4b. The brush 6 rides on these commutator segments, while the other brush 7 rides on the portion 4-5 of the commutator functioning substantially as a slip ring. The brush 6 is connected directly to a terminal 5-3 and, via a resistance 5a, to a negative DC supply terminal 5-2. The brush 7 is connected directly to a positive DC supply terminal 5-1. Hence, as the commutator 4 rotates in the direction of the arrow A, a succession of rectangular pulses are developed across the terminals 5-2 and 5-3. These pulses are of course in phased relationship to the rotation of the rotor in the DC motor 1 and are therefore referred to as "rotor position signal" or "rotor position pulses" in this specification and in the claims appended thereto.

Figure 3:
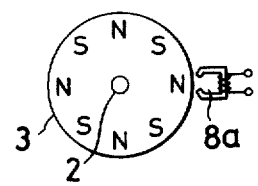
FIG. 3 is a view explanatory of alternative means for the production of the rotor position signal.

Such rotor position signal can also be generated by the configuration shown in FIG. 3, in which a rotor 3 in the form of a cylindrical magnet is fixedly mounted on the motor shaft 2. This rotor has alternating north and south poles N and S formed circumferentially thereon at angular spacings of 45°. Mounted opposite to the rotor 3 with an appropriate spacing therebetween is a pickup including an induction coil 8a such that an alternating voltage utilizable as the rotor position signal is induced in the coil with the rotation of the motor. The induction coil 8a is replaceable by other means or elements known in the art.

Although not illustrated, it will be understood that a similar rotor position signal is likewise obtainable in the form of pulses derived from inductance as the commutator segments are short circuited by the brushes. In the case of a tripolar motor of well known construction, six equally spaced pulses will be produced for each complete revolution of its rotor.

Figure 4:
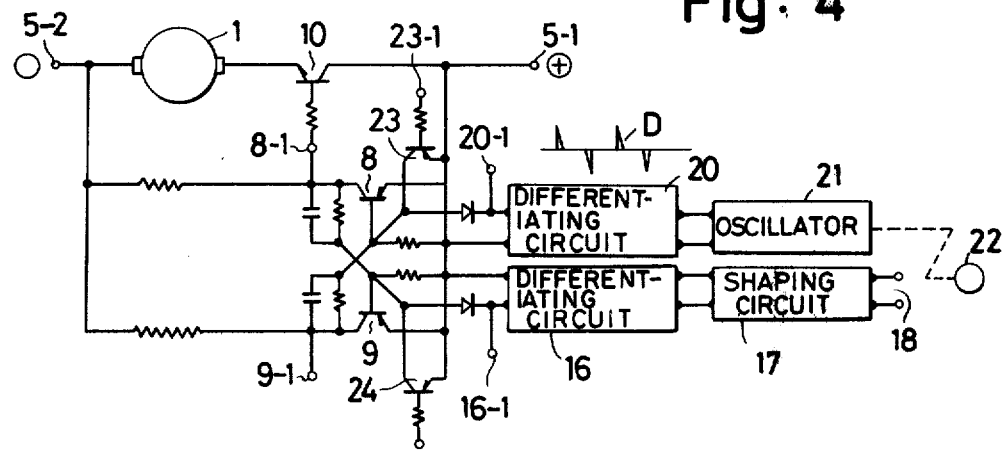
FIG. 4 is a schematic electrical diagram showing a circuit for driving a direct-current motor in step with the frequency of a synchronizing signal by way of explanation of the fundamental principles of this invention.

The fundamental concepts underlying the synchronous speed control of a DC motor are best illustrated in FIG. 4. A pair of transistors 8 and 9 constitute in combination a flip-flop circuit. A multivibrator or oscillator including a unijunction transistor is provided at 21 to produce the synchronizing signal, and the frequency of its oscillations is regulatable as by the manual turn of a knob 22 provided thereto. The output from the oscillator 21 is delivered to a differentiator 20, and each negative one of the train D of "differentiated" synchronizing pulses therefrom is delivered to the base of the transistor 8 thereby causing conduction therethrough and nonconduction through the other transistor 9.

A transistor 10 is connected in series with the DC motor 1 across a pair of DC supply terminals 5-1 and 5-2 to control the flow of current from the DC power supply to the motor. This transistor 10 becomes conductive as its base voltage rises upon conduction of the transistor 8, thereby initiating the supply of electrical energy to the motor. As the DC motor 1 is thus set in rotation, the aforesaid rotor position signal is delivered to a pair of terminals 18 from the means shown in FIG. 2 or 3. This rotor position signal is shaped into a rectangular wave at a waveform shaping circuit 17, and the rectangular wave output from the circuit 17 is delivered to a differentiator 16. Each negative pulse produced by this differentiator is impressed to the base of the transistor 9 to cause conduction therethrough. The flip-flop circuit consisting of the transistors 8 and 9 is now switched, and the transistors 8 and 10 are both rendered nonconductive to discontinue the supply of electrical energy to the motor 1.

As will be understood from the foregoing description of the fundamental circuit of FIG. 4, the supply of electrical energy to the motor 1 is initiated by each pulse of the external synchronizing signal and is suspended by each pulse of the rotor position signal. Thus, the motor normally runs in synchronism with the frequency of the external synchronizing signal, as hereinafter explained in more detail with reference to FIG. 5A.

Figure 5A:
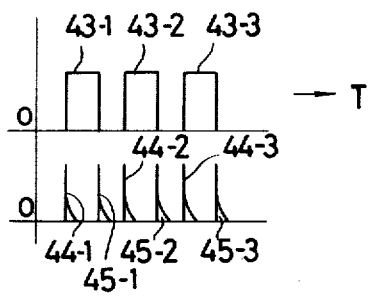
FIGS. 5A, 5B and 5C are graphic representations of motor driving pulses as formed by the rotor position signal and a synchronizing signal, the graphs being explanatory of the various operating conditions of the motor.

In the graph of FIG. 5A the arrow T indicates the lapse of time. The pulses 44-1, 44-2 and 44-3 represent the synchronizing signal, and the pulses 45-1, 45-2 and 45-3 the rotor position signal. Accordingly, the current pulses delivered to the motor 1 to cause its rotation (hereinafter referred to as "driving pulses") can be represented by those indicated as 43-1, 43-2 and 43-3. During a starting period, the synchronizing pulses 44-1, 44-2 . . . only are supplied consecutively to permit the motor to be fed continuously from the DC power supply. The motor speed up until the pulses of the synchronizing signal and the rotor position signal are produced alternately, whereupon the motor starts running at synchronous speed as in the graph of FIG. 5A.

If now the load to which is connected the drive shaft of the motor 1 increases, the rotor position pulses 45-1, 45-2 . . . will be produced at correspondingly delayed time with respect to the synchronizing pulses 44-1, 44-2 . . . thereby increasing the durations of the driving pulses 43-1, 43-2 . . . during which the motor is fed from the DC power supply. Synchronous motor speed is thus maintained. On the other hand, if the load decreases, the rotor position pulses will be produced in such a manner that the durations of the driving pulses are shortened to maintain the synchronous motor speed. Such automatic readjustment of motor speed takes place without any substantial delay. Moreover, in case the frequency of the external synchronizing signal is increased or decreased, the phase of the synchronizing pulses 44-1, 44-2 . . . correspondingly shifts with respect to that of the rotor position pulses 45-1, 45-2 . . . to increase or decrease the durations of the driving pulses 43-1, 43-2 . . . , so that the motor is accelerated or decelerated as required so as to be held at synchronous speed.

It may be noted, however, that the normal synchronous operation of the motor set forth in the preceding paragraph is possible only where the changes in the load in the frequency of the synchronizing signal are carried out under normal operating conditions with regard to torque output, rotor inertia and so forth. The motor may pull out of synchronism in the event of too abrupt changes in the load or in the frequency of the synchronizing signal, especially during the starting period, as hereinafter discussed in further detail.

If $n$ synchronizing pulses are produced consecutively between two adjacent rotor position pulses, the motor is in rotation at $1/n$ the required synchronous speed. Conversely, if $n$ rotor position pulses are produced consecutively between two adjacent synchronizing pulses, the motor is in rotation at $n$ times the synchronous speed. The former condition represents quasi-stable motor operation under heavy load, and the latter represents quasi-stable motor operation under light load.

Figure 5B:
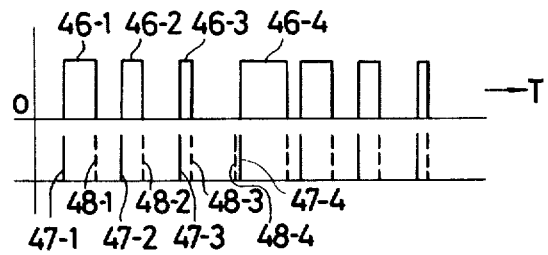

The phenomenon known as "beating" must also be taken into consideration, as explained hereinbefore with reference to FIG. 5B which is plotted on the assumption that the load is decreasing rapidly. In the graph of FIG. 5B, pulses 47-1, 47-2 . . . represent the synchronizing signal, and pulses 48-1, 48-2 . . . the rotor position signal. Since the motor speed increases in inverse proportion to the decreasing load, the rotor position pulses are so produced as to gradually shorten the durations of the driving pulses 46–1, 46–2 . . . It is assumed that in spite of the shortened durations of these driving pulses, the motor does not decelerate correspondingly, due for example to the presence of great inertial forces. The durations of the driving pulses are thus gradually shortened from 46–1 through 46–2 to 46–3, until at last the rotor position pulse 48–4 is produced earlier than the synchronizing pulse 47–4. As the two rotor position pulses 48–3 and 48–4 are thus supplied consecutively, the control circuit shown in FIG. 4 succeedingly produces a driving pulse 46–4 of the maximum duration. The durations of the succeedingly produced driving pulses become gradually shorter again until the next driving pulse of the maximum duration is produced again. This is wat is referred to in this specification as the "beating" of the synchronizing signal and the rotor position signal.

Figure 6:
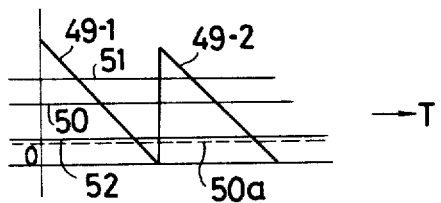
FIG. 6 is a graph explanatory of the driving pulses generated in the event of the beating of the rotor position signal and the synchronizing signal.

The foregoing description of the beating phenomenon is best illustrated in the graph of FIG. 6, in which the axis of abscissas represents time and the axis of ordinates the durations of the driving pulses. As will be seen from this graph, the driving pulse durations gradually decrease with time, suddenly rise to the maximum, and then gradually decrease again, as indicated by the numerals 49–1 and 49–2. The mean current value of these driving pulses produced as a result of the beating of the synchronizing signal and the rotor position signal is at one half the maximum height of the triangular waves as indicated by the line 50 in FIG. 6.

This means that the motor speed is being controlled in accordance with the load imposed on the motor. It is accordingly apparent that the motor is not running at the desired synchronous speed. Since the mean value of the driving pulses during synchronous operation under light load must be at about the line 52 in the graph of FIG. 6, the actual motor speed upon beating of the synchronizing signal and the rotor position signal will be appreciably higher than the synchronous speed. The mean driving pulse value during synchronous operation under heavy load, on the other hand, must be at about the line 51 in FIG. 6, so that the actual motor speed will be lower than the synchronous speed in the event of the beating of the two signals. In either case the actual motor speed considerably deviates from the desired synchronous speed.

Figure 7:
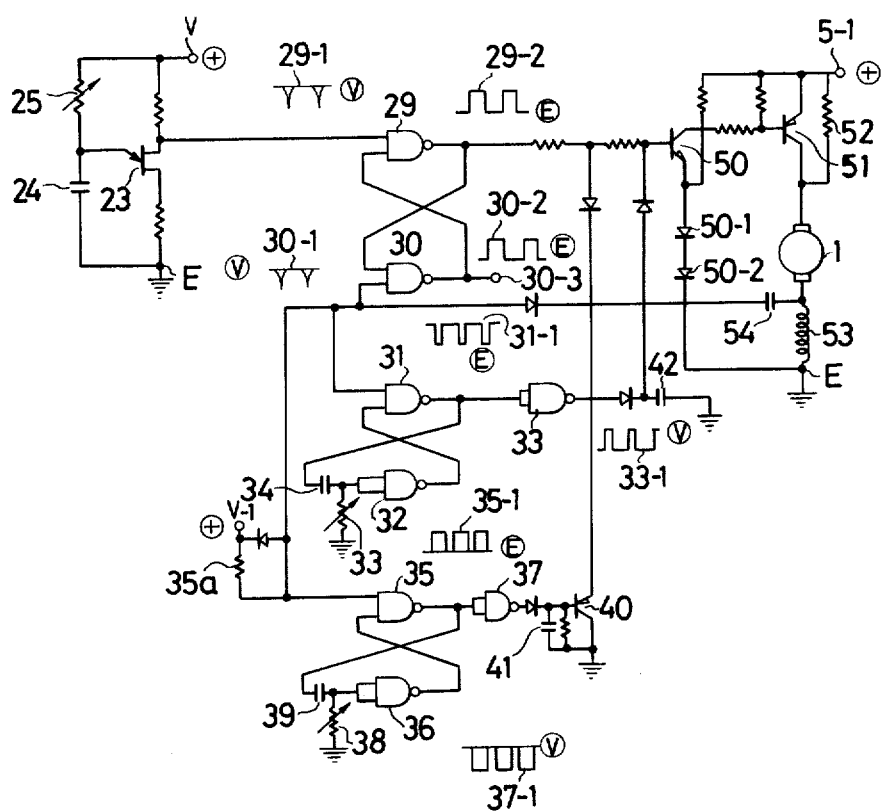
FIG. 7 is a schematic electrical diagram of the DC motor speed control system configured by way of a preferred embodiment of the invention.

In order to eliminate such deficiencies of the fundamental control circuit shown in FIG. 4, there is provided according to the invention a second and a third control circuit in combination with a first control circuit which is similar to the circuit of FIG. 4, as illustrated in FIG. 7 by way of a preferred embodiment of the invention. The reference characters V, Ⓥ and V–1 denote positive DC supply terminals adapted to deliver a constant voltage of 5 volts in this particular embodiment of the invention, and E and Ⓔ denote grounding terminals which serve the purposes of negative DC supply terminals. As previously mentioned with relation to FIG. 4, a unijunction transistor 23 is adapted to produce the synchronizing signal 29–1 at a frequency determined by capacitor 24 and variable resistor 25, the synchronizing signal being in the form of a train of negative pulses.

Also as briefly set forth with relation to FIG. 7, an inductance 53 is serially connected with the DC motor 1 in order to produce via capacitor 54 the rotor position signal in the form of a train of negative pulses 30–1. A pair of NAND circuits 29 and 30 constitute a flip-flop circuit such that the output from the NAND circuit 29 turns positive in response to the synchronizing signal 29–1 and negative in response to the rotor position signal 30–1. The waveform of the output from this NAND circuit is therefore as indicated at 29–2. Since transistor 50 and 51 are rendered conductive only by positive pulses, it will be understood that the flow of current from the DC power supply to the motor is initiated by each synchronizing pulse and is suspended by each rotor position pulse. A resistance 52 is connected in parallel with the transistor 51 so as to permit the flow of current of appropriately small magnitude to the motor 1 when the transistor 51 is nonconductive, in order that the rotor position signal may be produced unceasingly.

The above described operation of the first control circuit in this embodiment of FIG. 7 is exactly the same as that of the fundamental circuit of FIG. 4, so that the synchronous operation of the DC motor 1 is subject to the various deficiencies previously set forth. The second control circuit designed to eliminate part of such deficiencies includes a pair of NAND circuits 31 and 32 connected as seen in FIG. 7 to form a monostable circuit. The NAND circuit 31 is caused to produce pulses as graphically represented at 31–1, the durations of these output pulses being determined by variable resistor 33 and capacitor 34. Since a resistance 35a is connected to the positive DC supply terminal V–1, the negative pulses 30–1 of the rotor position signal are delivered to the NAND circuit 31 to trigger the production of its output pulses 31–1.

It is important to note that the time constant of the circuit consisting of the variable resistor 33 and the capacitor 34 is so determined that during normal synchronous operation of the motor 1, the output pulses 31–1 from the NAND circuit 31 have longer durations than the spacings of the rotor position pulses 30–1 and are therefore produced in overlapping relationship so as to be substantially in the form of a positive DC voltage. As the actual motor speed decreases out of synchronism as upon beating of the rotor position signal and the snynchronizing signal, however, the output from the NAND circuit 31 separates into discrete pulses.

Such forms of the output from the NAND circuit 31 are graphically represented in FIGS. 8A and 8B. The overlapping relationship of the output pulses 88–1, 88–2 . . . is seen in FIG. 8B, in which the dotted lines 89–1, 89–2 . . . indicate the instants at which the respective rotor position pulses are impressed to the NAND circuit 31. As the actual motor speed drops out of synchronism, the output pulses 88–1, 88–2 . . . are separated into discrete form by the rotor position pulses as in FIG. 8A.

Referring back to FIG. 7, the substantial DC output produced from the NAND circuit 31 during the normal synchronous operation of the motor is inverted by NOT circuit 33 to the level of ground potential and thus exerts no electrical influence upon the transistor 50. However, as the motor falls out of synchronism due to its rapid drop in speed as upon beating of the rotor position signal and the synchronizing signal, the output from the NAND circuit 31 takes the form of the discrete pulses 31–3 as above stated. The corresponding output from the NOT circuit 33 is as shown at 33–1, and this pulse output is caused to charge the capacitor 42, with the result that the transistor 50 is thereafter held conductive.

The motor 1 is thus fed continuously from the DC power supply until it accelerates sufficiently close to the synchronous speed, whereupon the output from the NOT circuit 33 returns to the level of ground potential. Hence, as the motor is pulled back into synchronism, the transistor 50 becomes unaffected by the output from the NOT circuit, so that synchronous motor operation is thereafter carried out in the usual manner by the first control circuit. It will have been understood that although the motor when heavily loaded inevitably decelerates and falls out of synchronism upon beating of the rotor position signal and the synchronizing signal, the signal voltage automatically produced then by the NOT circuit 33 serves to cause the motor to immediately accelerate up to the synchronous speed.

When under light load, on the other hand, the motor will accelerate and also fall out of synchronism upon beating of the two signals. This defect is overcome according to the invention by the third control circuit also illustrated in FIG. 7. The third control circuit likewise includes a pair of NAND circuits 35 and 36 constituting a monostable circuit. The rotor position signal 30–1 formed by the inductance 53 and capacitor 54 is delivered to the NAND circuit 35. The output from this NAND circuit 35 during the normal synchronous operation of the motor 1 is as graphically represented in FIG. 8C, in which the dotted lines 91–1, 91–2 . . . indicates the instants at which the respective rotor position pulses are impressed to the NAND circuit. The circuit consisting of variable resistor 38 and capacitor 39 has such time constant that the output from the NAND circuit 35 is produced in the form of discrete pulses 90–1, 90–2 . . . as in the graph of FIG. 8C during the normal synchronous operation of the motor. However, as the motor accelerates and falls out of synchronism, the output pulses from the NAND circuit 35 are produced in overlapping relationship as in the graph of FIG. 8D.

In FIG. 7 the output pulses produced by the NAND circuit 35 during normal synchronous motor operation are indicated at 35–1. These output pulses are inverted by NOT circuit 37 into the waveform shown at 37–1, and this output from the NOT circuit 37 is caused to charge capacitor 41, with the result that transistor 40 is rendered nonconductive. Hence, as long as the motor 1 is running at synchronous speed, the transistor 50 is held electrically unaffected by the third control circuit.

As the motor accelerates and falls out of synchronism upon beating of the rotor position signal and the synchronizing signal, the NAND circuit 35 of the third control circuit produces the substantial DC output of FIG. 8D as previously mentioned, thereby causing the output from the NOT circuit 37 to drop to ground potential. Conduction is then initiated through the transistor 40 to decrease the base voltage of the transistor 50. As this transistor 50 is thus rendered nonconductive, the supply of DC power to the motor 1 is thereafter held suspended until the motor decelerates sufficiently close to the synchronous speed. It will be apparent that the motor is pulled back into synchronism as the transistor 40 is rendered nonconductive upon production of the pulse output 37-1 from the NOT circuit 37. Diodes 50–1 and 50–2 seen in FIG. 7 are adapted to ensure the above described operation of the transistor 50.

As may be understood from the foregoing description of the second and third control circuits, it is appropriate that the NOT circuits 33 and 37 be caused to produce the output signals utilized to modify the operation of the transistor 50 only in event the motor 1 has accelerated or decelerated out of the speed range within which the motor can be pulled back into synchronism.

Figure 5C:
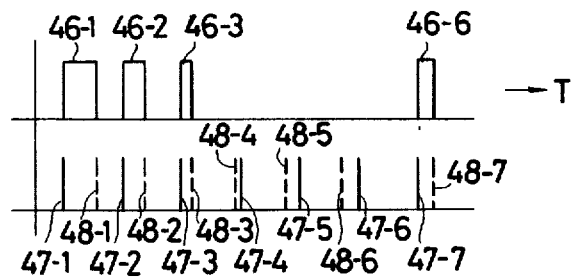

Reference is now directed to FIG. 5C in order to briefly describe the combined operation of the first and third control circuits of FIG. 7 in terms of the various voltage and current pulses produced. As the motor starts accelerating due for example to the rapid decrease in the load, with the resultant beating of the synchronizing pulses 47–1, 47–2 . . . and the rotor position pulses 48–1, 48–2 . . . , the NOT circuit 37 of the third control circuit produces its output signal to hold the transistor 50 nonconductive and hence to prevent the motor 1 from being fed from the DC power supply. The supply of the DC power to the motor is not resumed by the synchronizing pulses 47–4 to 47–6 that are produced while the transistor 50 is thus held nonconductive. The motor is caused to decelerate in the meantime. As the motor speed drops sufficiently close to the synchronous speed, the transistor 50 becomes electrically unaffected by the output signal from the NOT circuit 37, so that the driving pulses 46–6 . . . are produced again in the usual manner by the synchronizing pulses 47–7 . . . and the rotor position pulses 48–7 . . . thereby driving the motor at the desired synchronous speed. It will be apparent that the aforementioned quasi-stable motor operation at $n$ times or $1/n$ the synchronous speed is prevented in a similar manner.

FIG. 9 illustrates another preferred embodiment of the invention which in fact is a modification of the first control circuit shown in FIG. 7. The armature (rotor) of the DC motor under consideration is shown at 65a and the field coil at 70. A transistor 66a connected in parallel with the armature 65a has its base terminal 66–1 adapted to receive the output 30–2, FIG. 7, from the output terminal 30–3 of the NAND circuit 30. Another transistor 67a connected in series with the armature 65a has its base terminal 67–1 adapted to receive the output from the transistor 51 so as to be switched in step with the synchronizing signal frequency. As may be seen from FIG. 7, the output 30–2 from the NAND circuit 30 is 180 electrical degrees out of phase with the output 29–2 from the NAND circuit 29, so that the conducting periods of the transistors 66a and 67a alternate.

During conduction of the transistor 67a the armature 65a is fed from the DC power supply to cause the motor to produce driving torque. During conduction of the other transistor 66a the armature is prevented from being fed from the DC power supply by the transistor 67a, but then the power generated electromagnetically by this armature is released via the transistor 66a to cause the motor to produce retarding torque. A variable resistor provided at 66–1 is adapted to regulate the retarding torque thus produced. A chopper 69a including a transistor oscillator is adapted to interrupt the input to the base of the transistor 66a at regular time intervals. Since the frequency of the oscillations by the transistor oscillator is set higher than the frequency of the synchronizing signal, the flow of the retarding current is thereby made intermittent. Upon termination of the flow of the retarding current, a high electromotive force is generated in the direction of the arrow C in FIG. 9 due to the magnetic energy that has been stored. The energy thus obtained by the deceleration of the motor is fed back to the power supply via diode 68a.

Figure 10A:
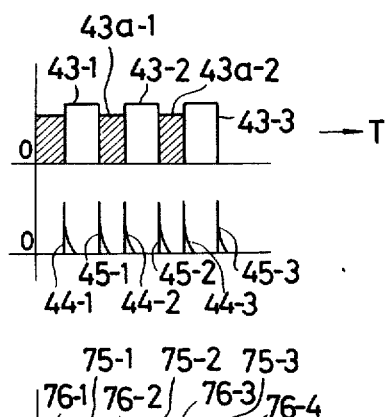
FIGS. 10A, 10B and 10C are graphic representations of driving pulses and retarding pulses as formed by the rotor position signal and the synchronizing signal in the embodiment of FIG. 9.

FIG. 10A graphically represents the driving pulses 43-1, 43-2 . . . produced during the normal synchronous operation of the DC motor controlled by this second preferred embodiment of the invention. As will be seen from the graph of FIG. 10A, the supply of DC power to the motor is initiated by the respective synchronizing pulses 44-1, 44-2 . . . and is suspended by the respective rotor position pulses 45-1, 45-2 . . . The hatched portions 43a-1, 43a-2 . . . between the driving pulses 43-1, 43-2 . . . represent what at hereinafter referred to as "retarding pulses" that are produced by the circuit arrangement of FIG. 9. It will accordingly be understood that the motor can be caused to vary its torque output in step with changing load conditions more faithfully than that of the first described embodiment of the invention.

Also as in the preceding embodiment, the motor is set in motion with high starting torque by being fed continuously from the DC power supply. No retarding torque is produced during this starting period. The beating of the synchronizing signal and the rotor position signal will not occur easily because motor speed is controlled more strictly by virtue of the retarding pulses. However, in the event the beating has somehow taken place between the two signals, the mean torque output of the motor will markedly decrease due to the retarding pulses. If the dashed line 50a in the graph of FIG. 6 is assumed to represent such markedly decreased torque output of the motor, it will be apparent that the actual motor speed always becomes lower than the synchronous speed in the event of the beating of the synchronizing signal and the rotor position signal, either when the motor is under heavy or light load. However, since then a number of synchronizing pulses become interposed between the adjacent rotor position pulses, the motor can be easily accelerated up to the synchronous speed. While the beating of the two signals is more likely to occur when the motor is under light load, the motor speed can then be automatically readjusted as in the preceding embodiment.

Figure 10B:
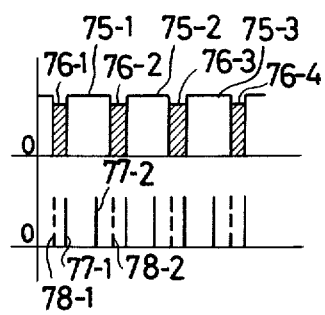

In this second embodiment of the invention it may relatively frequently happen that the motor rotates at ½, ⅓, or ¼ the synchronous speed when heavily loaded. When, for example, the motor is in rotation at one half the synchronous speed, the spacing between adjacent rotor position pulses 78-1, 78-2 . . . is twice as long as the spacing between adjacent synchronizing pulses 77-1, 77-2 . . . as seen in FIG. 10B. Two consecutive synchronizing pulses are therefore interposed between the adjacent rotor position pulses. This is particularly likely to occur at the time of motor starting. It will be understood that the resulting driving pulses 75-1, 75-2 . . . also shown in FIG. 10B would be produced if the arrangement of FIG. 9 were combined with the fundamental circuit of FIG. 4, without provision of the second control circuit shown in FIG. 7.

More specifically, such undesirable driving pulses would be produced if the output from the transistor 8 of FIG. 4 were delivered to the base of the transistor 67a of FIG. 9. In that case the signal which has rendered the transistor 8 of FIG. 4 conductive is used to cause conduction through the transistor 67a of FIG. 9 thereby initiating the supply of electrical energy to the armature 65a. The signal which has rendered the transistor 9 of FIG. 4 conductive and the transistor 8 nonconductive is used to render the transistor 66a of FIG. 9 conductive and the transistor 67a nonconductive thereby suspending the supply of electrical energy to the armature and also causing the production of the above explained retarding torque to be initiated. By the succeeding synchronizing pulse the conducting periods of the transistors 8 and 9, FIG. 4, and of the transistors 66a and 67a, FIG. 9, are so switched that the motor is fed from the DC power supply while the production of the retarding torque is suspended. In this manner the driving pulses 75-1, 75-2 . . . and the retarding pulses 76-1, 76-2 . . . are produced alternately, causing the motor to make quasi-stable rotation at one half the required synchronous speed.

Figure 10C:
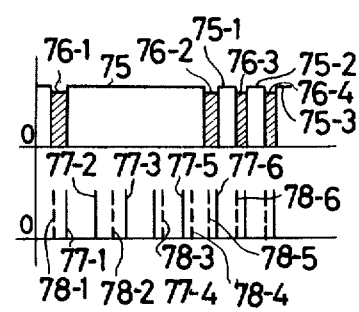

This defect is overcome according to the invention by combining the arrangement of FIG. 9 with the first and second control circuits shown in FIG. 7. FIG. 10C graphically represents the desired driving pulses that are actually produced by this second preferred embodiment of the invention. The two consecutive synchronizing pulses 77-1 and 77-2 interposed between the adjacent rotor position pulses indicates that the motor is in rotation at one half the required synchronous speed. As the motor has decelerated or starts decelerating to this speed, the NAND circuit 31 of the second control circuit produces its output signal to cause the transistors 50 and 51 to be held conductive. The driving pulse produced during this conducting period of the transistors 50 and 51 is shown at 75. The NAND circuit 31 terminates the production of the output signal when the motor speed comes sufficiently close to the synchronous speed. The motor is then automatically pulled back into synchronism, and the synchronizing pulses 77-6 . . . and the rotor position pulses 78-6 . . . are thereafter produced alternately to provide the driving pulses 75-1, 75-2 . . . and the retarding pulses 76-2, 76-3 . . . in the normal fashion.

This second embodiment of the invention may not be provided with the third control circuit comprising the NAND circuits 35 and 36, the NOT circuit 37 and so forth as shown in FIG. 7, because the beating of the rotor position signal and the synchronizing signal is highly unlikely to happen and because the motor speed will not rise to an integral multiple of the required synchronous speed. However, in case the retarding torque produced by the arrangement of FIG. 9 is relatively small, that is, in case the value of the variable resistor 66-2 is relatively high, it will be appropriate that the third control circuit be also provided. It is a notable advantage of this second embodiment that if the production of the synchronizing signal is discontinued during motor operation, the retarding pulses only are to be delivered to the motor to cause the same to make a rapid stop. Furthermore, if the frequency of the synchronizing signal is gradually lowered during motor operation, the durations of the retarding pulses will become correspondingly longer to cause the motor to decelerate rapidly.

FIG. 11 illustrates a further preferred embodiment of the invention in which the retarding torque is not produced electromagnetically as in the preceding embodiment but is provided in the form of counter torque. As illustrated, four transistors 79, 80, 81 and 82 are connected in the form of a bridge circuit across the pair of DC supply terminals. The armature coil 85 of the DC motor under control is connected between a point of junction of the series connected transistors 79 and 81 and a point of junction of the series connected transistors 80 and 82.

Upon application of a voltage to terminal 79-1 the transistor 79 becomes conductive thereby causing the transistor 80 to become nonconductive via resistances 83-1 and 83-2. The transistor 82 also becomes conductive because then its base voltage is elevated via resistances 84-3 and 84-4, while the transistor 81 becomes nonconductive because its base voltage is lowered via resistances 84-1 and 84-2. As a consequence, the current from the DC power supply flows through the armature coil 85 from the left to the right as seen in FIG. 11 thereby causing the motor to produce forward or driving torque.

When the delivery of the signal to the terminal 79-1 is terminated, the transistor 79 becomes nonconductive, with the result that the transistors 80 and 81 both become conductive and the transistor 82 nonconductive. Thereupon the current from the DC power supply flows through the armature coil 85 from the right to the left thereby causing the motor to produce counter or retarding torque. It will accordingly be apparent that if the output from the transistor 51, FIG. 7, is delivered to the terminal 79-1, the motor can be driven synchronously by the driving pulses and retarding pulses produced as in the graph of FIG. 10A. The retarding torque supplied in the form of counter torque as above stated is particularly effective to ensure synchronism at low motor speed.

If the counter torque produced by the arrangement of FIG. 11 is so regulated by diode 86 and resistance 87 as to approximate the forward torque of the motor, it will result in highly effective retarding torque so that the beating of the synchronizing signal and the rotor position signal will hardly take place. As in the preceding embodiment of FIG. 9, however, the motor when heavily loaded might make quasi-stable rotation at one half the synchronous speed. This possibility can be eliminated by the provision of the second control circuit of FIG. 7, which functions in the manner previously set forth to accomplish the objects of the invention.

Although the DC motor speed control system according to the invention has been shown and described hereinbefore in terms of several specific embodiments thereof, it will be easy for those skilled in the art to devise many modifications or changes of such specific embodiments, and in some instances some features of the invention may be employed without corresponding use of other features. It is therefore appropriate that the invention be construed broadly and in a manner consistent with the fair meaning or proper scope of the following claims.

We claim:
1. A system for driving a direct-current motor in synchronism with an external synchronizing signal in the form of a train of pulses, said system comprising:
   a DC power supply for feeding said motor;
   means for producing said synchronizing signal;
   means for producing a rotor position signal in phased relationship to the rotation of said motor, said rotor position signal being also in the form of a train of pulses;
   a first control circuit for initiating the flow of current from said DC power supply through said motor in a forward direction thereof to cause the latter to produce driving torque in response to each pulse of said synchronizing signal and for terminating the flow of current from said DC power supply to said motor in response to each pulse of said rotor position signal;
   a second control circuit for modifying the operation of said first control circuit, said second control circuit including:
      first sensing means for producing an output signal upon sensing a first state in which the actual speed of said motor is lower than synchronous speed; and
      first circuit means responsive to said output signal from said first sensing means, said first circuit means being effective to cause said first control circuit to permit said motor to be fed continuously from said DC power supply as long as said output signal is being produced by said first sensing means; and
   a third control circuit for modifying the operation of said first control circuit, said third control circuit including:
      second sensing means for producing an output signal upon sensing a second state in which the actual speed of said motor is higher than the synchronous speed; and
      second circuit means responsive to said output signal from said second sensing means, said second circuit means being effective to cause said first control circuit to prevent said motor from being fed from said DC power supply as long as said output signal is being produced by said second sensing means.

2. The system as recited in claim 1, wherein said first sensing means of said second control circuit includes a first monostable circuit adapted to produce output pulses of prescribed durations by being triggered by the respective pulses of said rotor position signal, and wherein said second sensing means of said third control circuit also includes a second monostable circuit adapted to produce output pulses of prescribed durations by being triggered by the respective pulses of said rotor position signal.

3. The system as recited in claim 2, including means for setting the durations of said output pulses from said first monostable circuit longer than the spacings between the pulses of said rotor position signal appearing during the normal synchronous operation of said motor, said output pulses from said first monostable circuit being in overlapping relationship as long as said motor is running in synchronism with said synchronizing signal; means for setting the durations of said output pulses from said second monostable circuit shorter than the spacings between the pulses of said rotor position signal appearing during the normal synchronous operation of said motor, said output pulses from said second monostable circuit being discrete as long as said motor is running in synchronism with said synchronizing signal.

4. The system as recited in claim 3, wherein said first sensing means initiates the production of said output signal when said output pulses from said first monostable circuit start to be produced in discrete form due to the decrease in the speed of said motor out of synchronism with said synchronizing signal, and wherein said second sensing means initiates the production of said output signal when said output pulses from said second monostable circuit start to be produced in overlapping relationship due to the increase in the speed of said motor out of synchronism with said synchronizing signal.

5. The system as recited in claim 4, wherein said first control circuit comprises:

a flip-flop circuit including a first NAND circuit adapted to produce an output signal by being triggered by the respective pulses of said synchronizing signal, and a second NAND circuit adapted to produce an output signal by being triggered by the respective pulses of said rotor position signal; and a switching element connected between said DC power supply and said motor to control the flow of current from the former to the latter, said switching element being rendered conductive in response to said output signal from said first NAND circuit of said flip-flop circuit and to said output signal from said first sensing means of said second control circuit and being rendered nonconductive in response to said output signal from said second NAND circuit of said flip-flop circuit and to said output signal from said second sensing means of said third control circuit.

6. The system as recited in claim 5, wherein said first control circuit further includes a second switching element connected in parallel with the armature of said motor, said second switching element being controlled by said flip-flop circuit of said first control circuit so as to be held nonconductive during conduction of the first recited switching element of said first control circuit and to be held conductive during nonconduction of said first switching element, whereby upon conduction of said second switching element the electromotive force induced in said armature is released to cause said motor to produce retarding torque.

7. The system as recited in claim 6, including a chopper adapted to interrupt at regular intervals the output from said flip-flop circuit of said first control circuit to said second switching element.

8. The system as recited in claim 1, wherein the armature coil of said motor is connected between a point of junction of first and second transistors connected in series across the terminals of said DC power supply and a point of junction of third and fourth transistors also connected in series across the terminals of said DC power supply, said first and said third transistors being rendered conductive and nonconductive alternately with said second and said fourth transistors in response to the operation of said first control circuit in order to cause the current from said DC power supply to flow through said armature coil in alternately opposite directions whereby said motor is caused alternately to produce driving torque and counter torque.

* * * * *